Inventor
PAUL M. ERLANDSON

Patented July 26, 1949

2,476,966

UNITED STATES PATENT OFFICE 2,476,966

RADIAL BEAM TUBE ASSEMBLY

Paul M. Erlandson, United States Navy

Application October 25, 1945, Serial No. 624,616

13 Claims. (Cl. 343—120)

(Granted under the act of March 3, 1883, as amended April 30, 1928; 370 O. G. 757)

This invention relates to electronic measuring equipment, and more particularly to equipment for simultaneously measuring the amplitude of a number of separate voltages or currents.

A further aspect of this invention consists of improvements in radial beam type vacuum tubes as applied to measuring systems wherein a number of separate voltages or currents are to be measured.

In existing systems wherein it is desired to measure the values of a number of separate voltages or currents, separate indicating instruments are used in each circuit. If such voltages or currents are of small amplitude, separate amplifiers may be necessary in each circuit to provide resultant voltages adequate to actuate the indicating instruments. Since it is difficult to maintain constant amplification in vacuum tube amplifiers, and even more difficult to construct and maintain a number of separate vacuum tube amplifiers with identical characteristics, such systems are inconvenient and do not provide an accurate comparison of the initial voltages or currents. It has been suggested that the above disadvantages may be avoided by the use of a common amplifier with mechanical switching devices to switch the input and output terminals of the amplifier synchronously from one circuit to another. While this proposal avoids a group of identical amplifiers, it is subject to the limitations in speed, contact, wear, etc., inherent in mechanical switches.

In general, it is the object of the present invention to avoid the above-mentioned difficulties in measuring equipment by the use of electronic devices having no moving parts to synchronously switch an amplifier from one circuit to another.

Further in accordance with my invention, magnetically focused radial beam type vacuum tubes such as those disclosed in Patent 2,217,774 are utilized to provide the electronic switching means.

Also, in accordance with my invention, magnetically focused radial beam type vacuum tubes are synchronized by the use of a single magnetic structure.

In accordance with a further aspect of my invention, magnetically focused radial beam type vacuum tubes are synchronized by the use of separate magnetic structures and a common alternating current excitation system.

Other objects and aspects of the invention will be apparent from the following description and claims.

Figure 1:
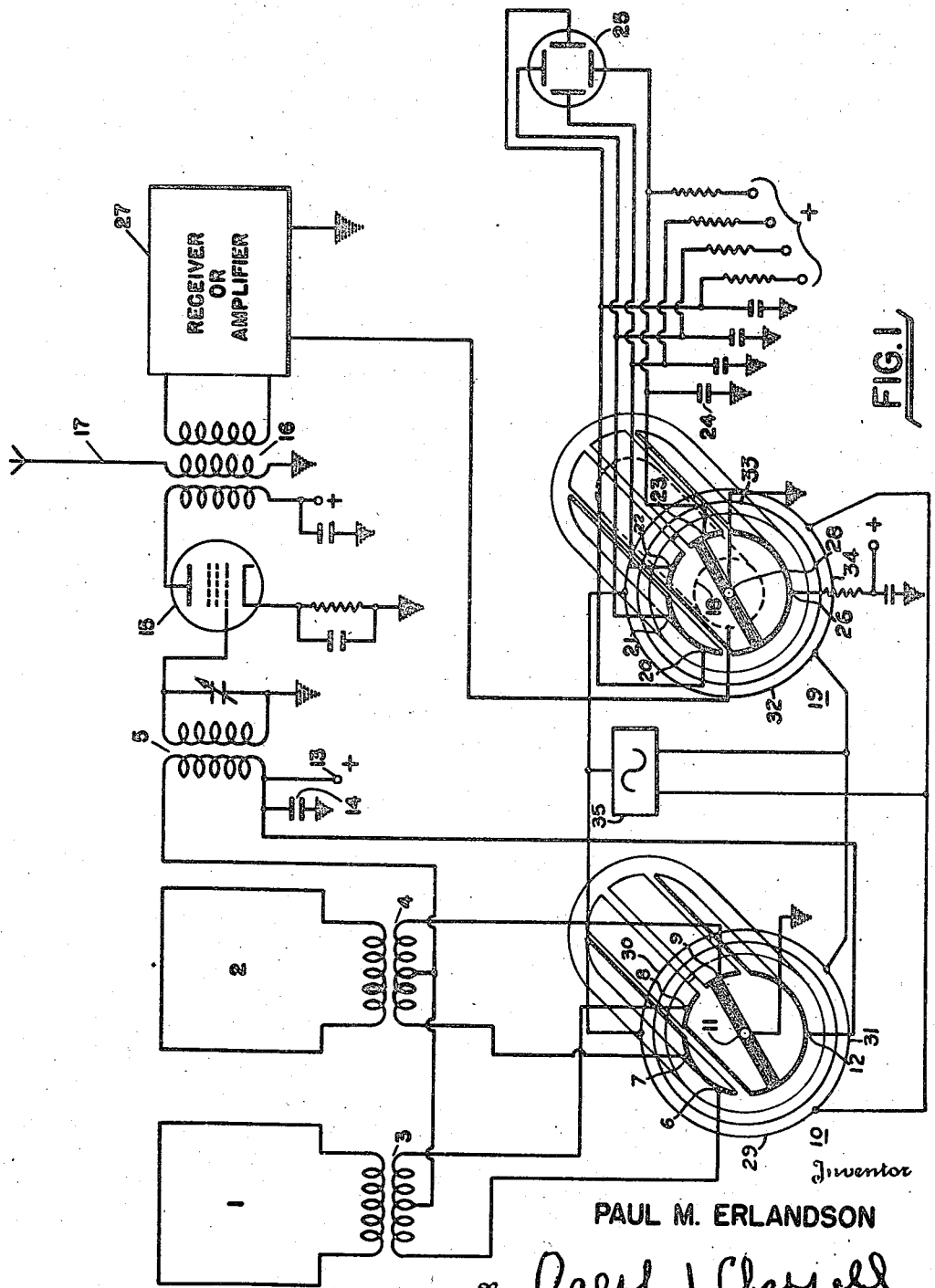
Figure 1 shows my invention as applied to a radio system of the type used in a radio direction finder.

Figure 1 shows the application of my invention to a measuring system. For purposes of illustration, a measuring system such as that used in a radio direction finder is shown. In the figure, 1 and 2 are orthogonal crossed loops connected to the primaries of identical impedance matching radio frequency transformers 3 and 4 respectively. The secondary of each transformer is center tapped, and the center tap is connected to the primary of radio frequency transformer 5 as shown. The remaining leads of the secondaries of transformers 3 and 4 are connected to plates 6, 7, 8 and 9 of radial beam type vacuum tube 10. By means which will be described in further detail below, the radial beam type vacuum tube provides a beam of electrons emitted from cylindrical cathode 11 consisting of a substantially plane surface rotating around cathode 11. Since the cathode 11 of radial beam type vacuum tube 11 is grounded, and since the plates 6, 7, 8, 9 and 12 are positively biased from connection 13 with the positive supply voltage, the effect of rotation of the electron beam is to place successively the plates 6, 7, 8 and 9 of the tube at ground radio frequency potential, and will alternately complete four radio frequency circuits through the four different portions of the secondaries of radio frequency transformers 3 and 4 and the primary of transformer 5. By-pass condenser 14 maintains point 13 at ground radio frequency potential. Since the positive bias at 13 is large compared to the radio frequency voltages impressed on the plate of tube 10, the resulting effect will be to impress on the control grid of amplifier tube 15 four successive currents or pulses of radio frequency voltage corresponding to the successive voltages induced in the four paths in the secondaries of transformers 3 and 4 at intervals determined by the rotational rate of the electron beam in tube 10.

Radio frequency amplifier tube 15 receives grid voltage from transformer 5 and its output is connected to one winding of radio frequency transformer 16. The voltage coming in on the omnidirectional sense antenna 17 is connected to another winding of radio frequency transformer 16 in such a manner that the input voltage to amplifier 27 is in four successive trains or pulses of voltage representing the responses of four cardioidal antenna patterns, each pattern successively rotated in space by 90°. The use of an omnidirectional sense antenna 17 is a well-known expedient in the direction finder art, being described in detail in Radio Engineer's Handbook by Terman at page 875. Unit 27 consists of the components of a conventional superheterodyne radio receiver comprising a first detector and local oscillator, intermediate frequency amplifiers, second detector, local oscillator if required, and audio frequency amplifier. The output of unit 27 will consist of a series of four successive trains or pulses of voltage representing the responses of the four cardioidal antenna patterns, each pattern successively rotated in space by 90°. This output is applied to control grid 18 of a second radial beam vacuum tube 19 operated as a triode amplifier. The electron beam of this tube is synchronized with the electron beam of vacuum tube 10 in rotational velocity and position by means of the polyphase induction motor stators 29, 30, 31 and 32, 33, and 34, to be explained in further detail below. The effect of this operation of tube 19 is to produce successively on plates 20, 21, 22 and 23 of radial beam tube 19, voltages which are proportional respectively to the voltages impressed on the plates 6, 7, 8 and 9 of radial beam vacuum tube 10. The output voltages appearing on the plate of radial beam tube 19 may be used to charge identical condensers such as 24 of value chosen to give a circuit time constant appreciably greater than the time between successive charging pulses as determined by the rotational rate of electron beams in tubes 10 and 19. The condensers 24 are therefore charged to potentials proportional to the radio frequency potentials applied in the circuits of the corresponding plates of tube 10.

Electrostatic deflection plates of a cathode ray tube 25 are connected to the four condensers 24 as shown. Voltages on plates 20, 21, 22 and 23 will therefore deflect a cathode ray beam in one of the four directions represented by the four deflecting plates of cathode ray tube 25. This will cause the luminous part of the cathode ray tube screen to assume a position corresponding to the azimuthal angle of arrival of a radio frequency field at the collector system, antennas 1 and 2, and such angle may be derived from an azimuth scale placed around the screen of the cathode ray tube.

Radial beam type vacuum tubes 10 and 19 may comprise vacuum tubes of the general class described in U. S. Patent 2,217,774. In tubes of this class, the electron beam from the cathode to the plate is made to follow a narrow cycloidal path by a strong magnetic field, thereby producing a plane electron beam of length equal to the length of the cathode and whose axis is parallel to the magnetizing force. In tubes of this type, a plurality of anodes may be provided and the magnetic field rotated by a movable structure or use of a polyphase field winding. This causes the electron beam to successively flow from the cathode to the individual anodes. In applying the radial beam type vacuum tube to my invention, I provide semi-cylindrical anode 12 in tube 10 (anode 26 in tube 19), to absorb the beam flowing in the direction opposite to the desired direction. I am therefore enabled to commutate the electron beams between anodes 6, 7, 8, and 9 of tube 10 (20, 21, 22, and 23 of tube 19), without the use of special devices to cause the electron beam to pass in only one direction. As an alternative, a grid structure or other means such as those described in Patent 2,217,774 for causing electron flow in a single direction from the cathode may be provided.

In tube 19, I provide, in addition to the elements of tube 10, a control grid 18 disposed between operating anodes 20, 21, 22 and 23 and cathode 28. This grid provides control of the current in the electron beam of tube 19 in accordance with the output of radio receiver 27. It will be obvious to those skilled in the art that additional elements such as the screen grid and suppressor grid may be added if the desired performance of the tube requires them.

Figure 2:
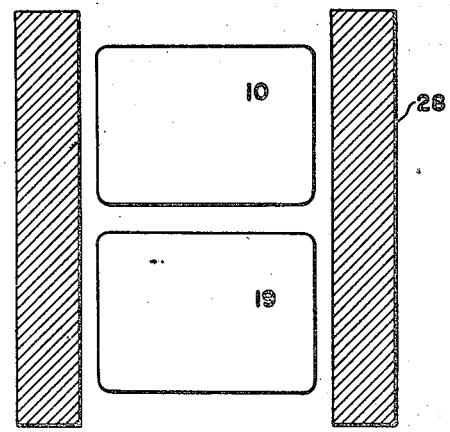
Figure 2 shows in cross section a method of synchronizing two magnetically focused radial beam type vacuum tubes by use of a single magnetic structure.

In the above described system, it is necessary to establish rotating magnetic fields within tubes 10 and 19 synchronized in rotational position and speed. Figure 2 shows one method of accomplishing this result. Tubes 10 and 19 are mounted within the same magnetic structure 28. This magnetic structure may consist of a polyphase induction motor stator excited from a suitable polyphase alternating current system. This excitation will produce a rotating magnetic field within unit 30 rotating at an angular velocity determined by the frequency of excitation of the unit. (See Theory of Alternating Current Machinery, Langsdrif, page 326.) Since the same field acts upon tube 10 and tube 19, the rotation of electron beam in the two tubes will be identical in magnitude and speed. This will provide the synchronized switching action required for the apparatus of Figure 1. As an alternative, the magnetic field may be produced by a magnetic structure excited from direct current and physically rotated.

Figure 3:
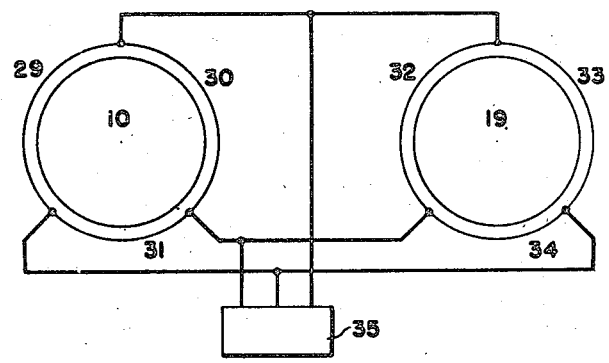
Figure 3 shows diagrammatically a method of synchronizing magnetically focused radial beam type vacuum tubes by use of separate magnetic structures and a common alternating current excitation system.

As an alternative to the use of a single magnetic structure, two separate synchronized structures may be provided. This method is shown in Figure 3. The polyphase induction motor stator for tube 10 consists of three phase windings 29, 30 and 31 connected for use with a three phase alternating current system. Tube 19 is equipped with a polyphase induction motor stator having an identical number of poles and wound for the same number of phases with windings 32, 33 and 34. The two induction motor stators are excited from a single three phase alternating current supply 35, thereby producing magnetic field in tube 10 identical in rotational position and speed with the magnetic field in tube 19. Since the electron beams follow the rotation of the magnetic field, the two electron beams are synchronized as required for the proper functioning of the apparatus of Figure 1. Although Figure 3 is drawn to show only the case of a three phase induction motor stator, it will be obvious to those skilled in the art that any number of phases in excess of one may be used. It is also obvious that to produce any desired rate of rotation of the electron beam it is merely necessary to choose the corresponding frequency for excitation of the induction motor stator.

It will be evident that the system as herein described is capable of considerable variation without departing from the spirit and scope of this invention. Specifically, this invention is applicable to any type of amplifier or system wherein it is desired to amplify or change a multiplicity of separate signals to exactly the same degree. In each case it is necessary to provide a radial beam vacuum tube to successively apply the various voltages to a common amplifying or converting system and then to use a synchronized radial beam type tube to separate the various signals after amplification or conversion.

The invention described herein may be manufactured and used by or for the Government of the United States of America for governmental purposes without the payment of any royalties thereon or therefor.

I claim:

1. In a measuring system, a plurality of incoming signals, an amplifier having input and output circuits, a plurality of radial beam type vacuum tubes, a common means for synchronizing the electron beams of the aforementioned tubes as to rotational speed and angular position, a radial beam type vacuum tube adapted to successively impress said signals on the input circuit of said amplifier, a second radial beam type vacuum tube adapted to successively impress output signals from said amplifier on indicating circuits corresponding in number to said separate incoming signals, said last mentioned tube having an electron beam corresponding in rotational speed and angular position to the electron beam of said first-mentioned tube.

2. In a radio receiving system, a radio receiver having input and output circuits, a plurality of incoming signals, a plurality of radial beam type vacuum tubes, a common means for synchronizing the electron beams of the aforementioned tubes as to rotational speed and angular position, a radial beam type vacuum tube adapted to successively impress said signals on the input circuit of a radio receiver, a second radial beam type vacuum tube adapted to successively impress output signals from said receiver on indicating circuits corresponding in number to said separate incoming signals, said last mentioned tube having an electron beam corresponding in rotational speed and angular position to the electron beam of said first mentioned tube.

3. In a radio direction finding system, a radio receiver having input and output circuits, a plurality of receiving antennas, a plurality of radial beam type vacuum tubes, a common means for synchronizing the electron beams of the aforementioned tubes as to rotational speed and angular position, a radial beam type vacuum tube adapted to successively impress signals from said antennas on the input circuit of a radio receiver, a second radial beam type vacuum tube adapted to successively impress output signals from said receiver on indicating circuits corresponding in number to the separate incoming signals, said last mentioned tube having an electron beam corresponding in rotational speed and angular position with the electron beam of said first mentioned tube.

4. In a measuring system, a plurality of incoming signals, an amplifier having input and output circuits, a plurality of radial beam type vacuum tubes, a common means for synchronizing the electron beams of the aforementioned tubes as to rotational speed and angular position, a radial beam type vacuum tube having a plurality of anodes, circuit means connecting said incoming signals to separate anodes of said tube, circuit means connecting said tube to the input circuit of said amplifier, a second radial beam type vacuum tube having a plurality of anodes, circuit means connecting said last mentioned tube to the output circuit of said amplifier, indicating circuits corresponding in number to said separate incoming signals, circuit means connecting said output circuits to said last mentioned anodes, said last mentioned tube having an electron beam corresponding in rotational speed and angular position to the electron beam of said first mentioned tube.

5. A radio receiver, a plurality of input circuits and an output circuit, a plurality of radial beam type vacuum tubes, a common means for synchronizing the electron beams of the aforementioned tubes as to rotational speed and angular position, a radial beam type vacuum tube having a plurality of anodes, circuit means connecting said anodes to said incoming circuits, circuit means connecting said tube to the input circuits of a radio receiver, a second radial beam type vacuum tube having a plurality of anodes connected to the output circuit of said receiver, indicating circuits corresponding in number to said separate input circuits and connected to said last mentioned anodes, said last mentioned tube having an electron beam corresponding in rotational speed and angular position to the electron beam of said first mentioned tube.

6. In a radio direction finding system, a radio receiver having input and output circuits, a plurality of receiving antennas, a plurality of radial beam type vacuum tubes, a common means for synchronizing the electron beams of the aforementioned tubes as to rotational speed and angular position, a radial beam type vacuum tube having a plurality of anodes, circuit means connecting said receiving antennas to said anodes, circuit means connecting said radial beam type vacuum tube to the input circuit of said radio receiver, a second radial beam type vacuum tube having a plurality of anodes and connected to the output circuit of said receiver, indicating circuits corresponding in number to the signals from said separate receiving antennas and connected to anodes of said last mentioned tube, said last mentioned tube having an electron beam corresponding in rotational speed and angular position to the electron beam of said first mentioned tube.

7. In a radio system, a radio receiver having input and output circuits, a directional antenna, a second directional antenna, said second mentioned antenna mounted at right angles to said first mentioned antenna, a plurality of radial beam type vacuum tubes, a common means for synchronizing the electron beams of the aforementioned tubes as to rotational speed and angular position, a radial beam type vacuum tube having four anodes disposed to form a semi-cylindrical surface, circuit means connecting the first anode of said tube to said first mentioned antenna, circuit means connecting the third anode of said tube to said first mentioned antenna, circuit means connecting the second anode of said tube to said last mentioned antenna, circuit means connecting the fourth anode of said tube to said last mentioned antenna, circuit means connecting the neutral points of said antennas to the input circuit of said radio receiver, circuit means connecting the cathode of said tube to ground, a second radial beam type vacuum tube having four anodes disposed to form a semi-cylindrical surface, circuit means connecting the cathode of said last mentioned tube to ground, circuit means connecting a control element of said last mentioned tube to the output circuit of said receiver, four indicating circuits, circuit means connecting the four anodes of said last mentioned tube to said four indicating circuits, said last mentioned tube having an electron beam corresponding in rotational speed and angular position to the electron beam of said first mentioned tube.

8. In a measuring system, a plurality of incoming signals, a wave converting apparatus having input and output circuits, a plurality of radial beam type vacuum tubes, a common means for synchronizing the electron beams of the aforementioned tubes as to rotational speed and angular position, a radial beam type vacuum tube having a plurality of anodes and adapted to successively impress said signals on the input circuit of said wave converting apparatus, a second radial beam type vacuum tube having a plurality of anodes and adapted to successively impress signals from the output circuit of said wave converting apparatus on indicating circuits corresponding in number to said separate incoming signals, said last mentioned tube having an electron beam corresponding in rotational speed and angular position to the electron beam of said first mentioned tube.

9. In a measuring system, a plurality of incoming signals, a wave converting apparatus having input and output circuits, a plurality of radial beam type vacuum tubes, a common means for synchronizing the electron beams of the aforementioned tubes as to rotational speed and angular position, a radial beam type vacuum tube having a plurality of anodes, circuit means connecting said incoming signals to said anodes of said tube, circuit means connecting said tube to the input circuit of said wave converting apparatus, a second radial beam type vacuum tube having a plurality of anodes, circuit means connecting said last mentioned tube to the output circuit of said wave converting apparatus, indicating circuits corresponding in number to said separate incoming signals, circuit means connecting said output circuits to said anodes of said last mentioned radial beam type vacuum tube, said last mentioned tube having an electron beam corresponding in rotational speed and angular position to the electron beam of said first mentioned tube.

10. The system of claim 1, wherein the synchronizing means is a single magnetic structure within which the radial beam tubes are located.

11. The system of claim 1, wherein the synchronizing means is composed of separate magnetic structures and a common alternating current excitation system.

12. The system of claim 7, wherein the synchronizing means is a single magnetic structure within which the radial beam tubes are located.

13. The system of claim 7 wherein the synchronizing means is composed of separate magnetic structures and a common alternating current excitation system.

PAUL M. ERLANDSON.

REFERENCES CITED

The following references are of record in the file of this patent:

UNITED STATES PATENTS

| Number | Name | Date |
|---|---|---|
| 2,036,350 | Montani | Apr. 7, 1936 |
| 2,185,693 | Mertz | Jan. 2, 1940 |
| 2,263,369 | Skillman | Nov. 18, 1941 |
| 2,265,216 | Wolff | Dec. 9, 1941 |
| 2,284,475 | Plebanski | May 26, 1942 |
| 2,313,966 | Poch | Mar. 16, 1943 |
| 2,314,302 | Ziebolz | Mar. 16, 1943 |
| 2,322,556 | Ziebolz | June 22, 1943 |
| 2,408,039 | Busignies | Sept. 24, 1946 |